United States Patent [19]

Yoshioka

[11] Patent Number: 4,648,771

[45] Date of Patent: Mar. 10, 1987

[54] ROBOT HAND FOR STACKING BOXES

[76] Inventor: Ikuo Yoshioka, No. 5417, Nogurumi Onoda-shi, Yamaguchi-ken, Japan

[21] Appl. No.: 859,238

[22] Filed: May 7, 1986

Related U.S. Application Data

[63] Continuation of Ser. No. 747,289, Jun. 21, 1985, abandoned.

[30] Foreign Application Priority Data

Jul. 13, 1984 [JP] Japan ................................. 59-105115

[51] Int. Cl.$^4$ ............................................ B65G 57/08
[52] U.S. Cl. ....................................... 414/71; 294/88; 294/106; 414/30; 414/36; 414/744 A; 414/739
[58] Field of Search ......................... 414/36, 30, 57, 71, 414/744 A, 733, 734, 735, 739, 626; 294/31.1, 88, 106; 901/45

[56] References Cited

U.S. PATENT DOCUMENTS

| | | | |
|---|---|---|---|
| 1,834,499 | 12/1931 | Richter | 294/88 X |
| 3,306,646 | 2/1967 | Flora, Jr. | 294/2 |
| 3,651,957 | 3/1972 | Ball et al. | 294/106 X |
| 3,902,614 | 9/1975 | Roberts et al. | 414/735 |
| 4,273,506 | 6/1981 | Thomson et al. | 414/735 |

FOREIGN PATENT DOCUMENTS

| | | | |
|---|---|---|---|
| 2724978 | 12/1978 | Fed. Rep. of Germany | 414/30 |
| 3217914 | 12/1982 | Fed. Rep. of Germany | 414/30 |
| 46799 | 7/1966 | German Democratic Rep. | 414/30 |
| 2124994 | 2/1984 | United Kingdom | 414/30 |

Primary Examiner—Frank E. Werner
Attorney, Agent, or Firm—Stevens, Davis, Miller & Mosher

[57] ABSTRACT

A robot hand for stacking boxes in which lower ends of a pair of forks opposed to each other to support flanges at upper ends of a box are set at a predetermined level difference in a vertical direction.

3 Claims, 2 Drawing Figures

ROBOT HAND FOR STACKING BOXES

This application is a continuation of application Ser. No. 747,289 filed June 21, 1985, now abandoned.

BACKGROUND OF THE INVENTION

1. Field of the invention

This invention relates to a robot hand for stacking boxes in which lower ends of forks for supporting flanges on upper ends of a box are set at a predetermined level difference.

2. Description of the Prior Art

In these days, robots are widely used as labor-saving means for transferring, stacking and disassembling freight or goods which enhances the efficiency of loading and unloading operations. Generally, forks 1 and 2 opposed to each other of the robot hand have their positions for gripping a box 3 in the same level l—l line as shown in FIG. 2. Therefore, when freight, particularly boxes 3, having a projected portion a at the lower end thereof as shown, are successively stacked vertically by fitting the projected portion a, into an open position b at the upper end of a box 4 directly therebelow, and then the forks 1 and 2 are simultaneously spread to drop the box 3. However, the forks 1 and 2 are not always spread open simultaneously through the same angle. In case of material in the box 3, for example, powder or granular material g such as cement, sugar and cereals, the box may tilt and the projected portion a dropped in an inclined state onto the open portion b after the forks 1 and 2 have been spread open due to the variation of the position of the center of gravity of the material. Furthermore, there is a possibility that the box 4 undergoes vibrations and shocks due to the weight of the material g within the box 3 and fails to be held in a given position, and therefore, the suspending and gripping position of the box 3 by the forks 1 and 2 cannot be set at a given position and the position of the forks 1 and 2 unavoidably needs to be adjusted every time the operation takes place. As a consequence, this leads to one main factor which impairs the enhancement of working efficiency.

Moreover, there is a further possibility that the box 4 and material w therein which is a solid will be damaged and cracked due to the weight of material within the box 3 to be dropped. Accordingly, the stacking operation of the boxes 3 and 4 by the simultaneous spreading of the forks 1 and 2 at the same level is not always performed vertically and orderly. Sometimes considerable labor and time are required for adjustment.

SUMMARY OF THE INVENTION

It is therefore an object of the present invention to provide an arrangement wherein rectangular boxes each having a projected portion at a lower end thereof are always stacked at a predetermined position positively, easily and vertically to prevent freight from getting out-of-shape.

It is a further object of the present invention to provide an arrangement wherein vibrations and shocks at the time of stacking boxes vertically are suppressed to prevent the boxes and contents therein from being undesirably cracked, deformed or damaged.

This invention particularly provides a robot hand for stacking boxes in which lower ends of a pair of forks opposed to each other supporting flanges of a lengthwise box formed at its lower end with a projected portion are given before-hand a level difference in a vertical direction.

DESCRIPTION OF THE PREFERRED EMBODIMENT

Construction

Figure 2:
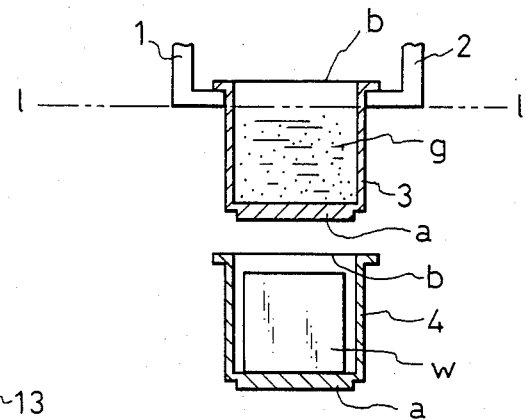
FIG. 2 illustrates a conventional box stacking state.
Figure 1:
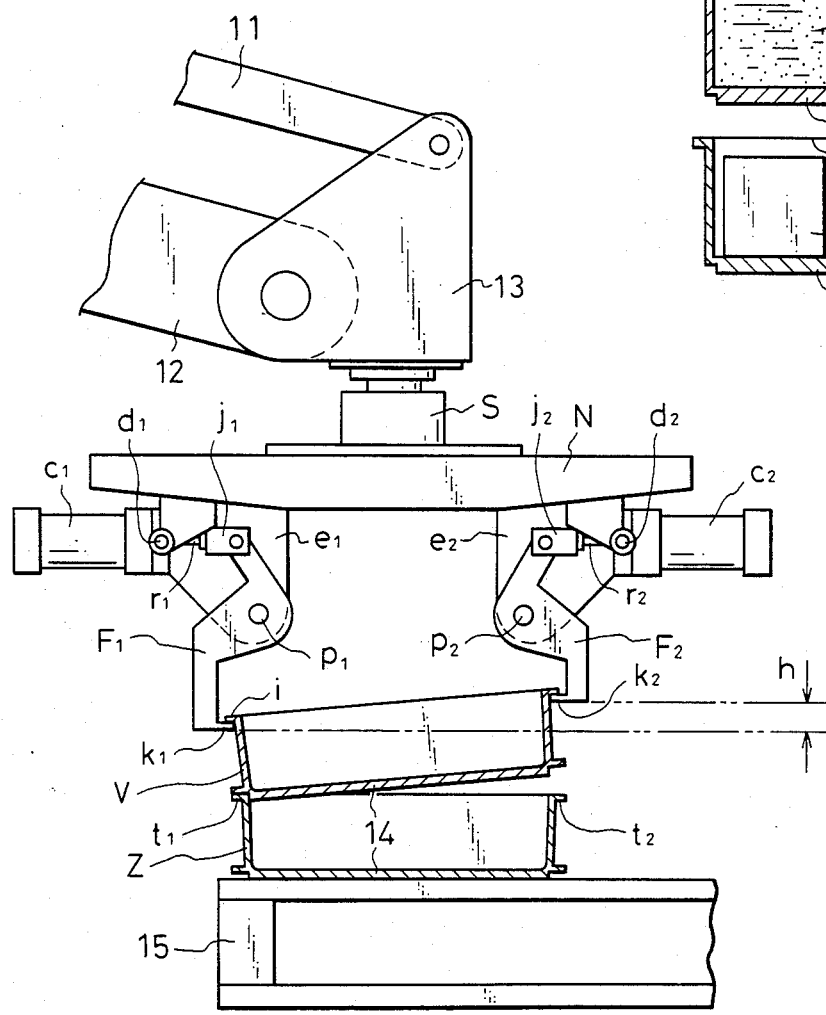
FIG. 1 illustrates a box stacking state in accordance with the present invention.

One embodiment of the present invention will be described hereinafter with reference to FIG. 1. Arms (not shown) are juxtaposed above a turning body rotatably supported on a base frame set at a predetermined position. A guide rod 11 and a link 12 are respectively pivotally mounted on the ends of these arms, and a suspending body S is rotatably suspended below a retainer body 13 movably hung from the guide rod 11. Support pieces $e_1$ and $e_2$ are secured to and hung from both sides of a bed board N coupled integrally with the suspending body S. One end of each of cylinders $C_1$ and $C_2$ is pivotally mounted on support shafts $d_1$ and $d_2$, respectively, which are laterally mounted on the support pieces $e_1$ and $e_2$. Connecting pieces $j_1$ and $j_2$ are coupled to ends of piston rods $r_1$ and $r_2$ secured to pistons (not shown) slidably fitted in the cylinders $C_1$ and $C_2$. Middle portions of forks $F_1$ and $F_2$ formed integrally with the connecting pieces $j_1$ and $j_2$ are rotatably pivotally mounted on support shafts $p_1$ and $p_2$, respectively, provided below the support pieces $e_1$ and $e_2$. The setting positions of bent pieces $k_1$ and $k_2$ at the ends of the forks $F_1$ and $F_2$, respectively, are held before-hand at a predetermined level difference h in a vertical direction whereby when a flange i at the upper end of a box V having a projected portion 14 at the lower end thereof is supported at a lower side thereof, the box V is inclined and held as shown by the solid line in FIG. 1. In the drawing, reference numeral 15 designates a place bed for stacking boxes; Z, a box on the place bed 15; and $t_1$ and $t_2$, flanges on both sides of the box Z.

Operation

In the present invention, the flange i of the box V is engaged and supported at the bent pieces $k_1$ and $k_2$ of the forks $F_1$ and $F_2$ to suspend and hold the box in an inclined state as shown by the solid line as shown. One end (left end in the illustrated embodiment) of the projected portion 14 of the box V is inserted internally of the flange $t_1$ on one side (left side in the illustrated embodiment) of the box Z already placed on the place bed 15. Thereafter the fork $F_2$ is rotated counterclockwise and spread open by the advancement of the piston rod $r_2$ in the cylinder $C_2$ to drop and insert the other end (right end in the illustrated embodiment) of the projected portion 14 of the box V inside the flange $t_2$ of the box Z. In this case, the fork $F_1$ is retained at a position shown by the solid line as shown to prevent the box V from being uselessly "deviated", that is, the fork $F_1$ functions as a so-called stopper. After the projected portion 14 of the box V has been inserted inside the flange $t_2$ of the box Z, the piston rod $r_1$ in the cylinder $C_1$ is advanced to rotate the fork $F_1$ clockwise and spread the fork $F_1$ to completely disengage the fork $F_1$ from the flange i of the box V thus terminating the stacking operation of the box V onto the box Z. In this manner, the robot awaits the preparation of the stacking operation for a next box.

Features

According to the present invention, since the setting position of a pair of forks opposed to each other are given a predetermined level difference, a box is held in an inclined fashion by the forks utilizing a flange. A projected portion of a suspended box is inserted into an inner surface on one side of a flange of a box held by one fork. The other fork is spread open to allow insertion of the other projected portion of the box into an inner surface on the other side of a flange of a box directly therebelow. Therefore, the stacked boxes are orderly connected and stacked in a vertical direction through the projected portions to free from a possibility of unexpected out-of-shape of boxes. Moreover, a box positioned directly below the above-positioned box undergoes hardly any vibrations and shocks as compared to conventional stacking means which vibrate due to the dropping of the suspended box thereby making the setting position unstable. Therefore, the setting position always can be held constant, and the suspended box always can be stacked at the same position to provide actual advantages such that there is no waste of time and boxes are freed from damages, cracks and the like.

While in the above-described explanation, stacking of boxes with flanges having a projected portion at the lower end thereof has been described, it should be noted that the present invention is not limited thereto but can be also applied to boxes with flanges in which a lower end is flat.

What is claimed is:

1. A robot hand for stacking boxes with flanged upper ends and projected lower end portions, said hand comprising a bed board, support pieces secured to and suspended from said bed board to support a first fork, support pieces secured to and suspended from said bed board to support a second fork, a support shaft laterally mounted on said support pieces for said first fork, a support shaft laterally mounted on said support pieces for said second fork, two cylinders, each cylinder having one end pivotally mounted on one of said support pieces, a piston rod attached to each of said cylinders for reciprocal movement, each of said piston rods being independently operable, a connecting piece connected to an extreme end of each of said piston rods, each fork formed integrally at one of its ends with one of said connecting pieces, having an intermediate portion pivotably mounted on one of said support shafts, and a bent portion at the other end, said bent portions of said first and second forks being in the same vertical plane and facing each other on different levels.

2. The robot hand according to claim 1 wherein said first and second forks are separately disengageable from said box so that when the boxes are stacked, one end of the projected portion in the upper box is fitted inside of one flange in the lower box by said first fork and the other end of said projected portion is then fitted inside of the other flange in the lower box by the rotation of said second fork, after which said first fork is disengaged from said one flange in the upper box.

3. The robot hand according to claim 1 wherein said first fork is stationary while said second fork is moving so that when the boxes are stacked, said first fork functions for one end of the projected portion as a stopper while the other end of the projected portion of the upper box is fitted inside of the other flange in the lower box.

* * * * *